United States Patent [19]

Pelabon

[11] 3,859,927

[45] Jan. 14, 1975

[54] ARTICULATED RAILWAY BOGIE SHIFTABLE DRIVE ASSEMBLY

[75] Inventor: Andre E. Pelabon, Paris, France

[73] Assignee: ANF Frangeco S.A., Courbevoie, Hauts de Seine, France

[22] Filed: Apr. 13, 1973

[21] Appl. No.: 350,806

[52] U.S. Cl. ............... 105/98, 105/99, 105/108, 105/117
[51] Int. Cl. ....... B61c 9/30, B61c 15/14, B61f 3/04
[58] Field of Search .......... 105/98, 99, 108, 96, 117

[56] References Cited
UNITED STATES PATENTS

| 1,077,769 | 11/1913 | Vauclain et al..................... 105/117 |
| 2,922,383 | 1/1960 | Oestricher .......................... 105/108 |
| 3,270,691 | 9/1966 | Zoellner............................. 105/98 X |

Primary Examiner—Lloyd L. King
Assistant Examiner—Howard Beltran
Attorney, Agent, or Firm—Fisher Christen & Sabol

[57] ABSTRACT

A system for the transmission of power from the prime mover of a powered railcar to the bogie wheels, without the use of telescoping shafts, is accomplished by mounting at least one of the gear elements in the power transfer mechanism on the bogie for axial displacement to compensate for variations in the distance between the prime mover output and transfer mechanism input caused by relative movement between the bogie and railcar.

7 Claims, 3 Drawing Figures

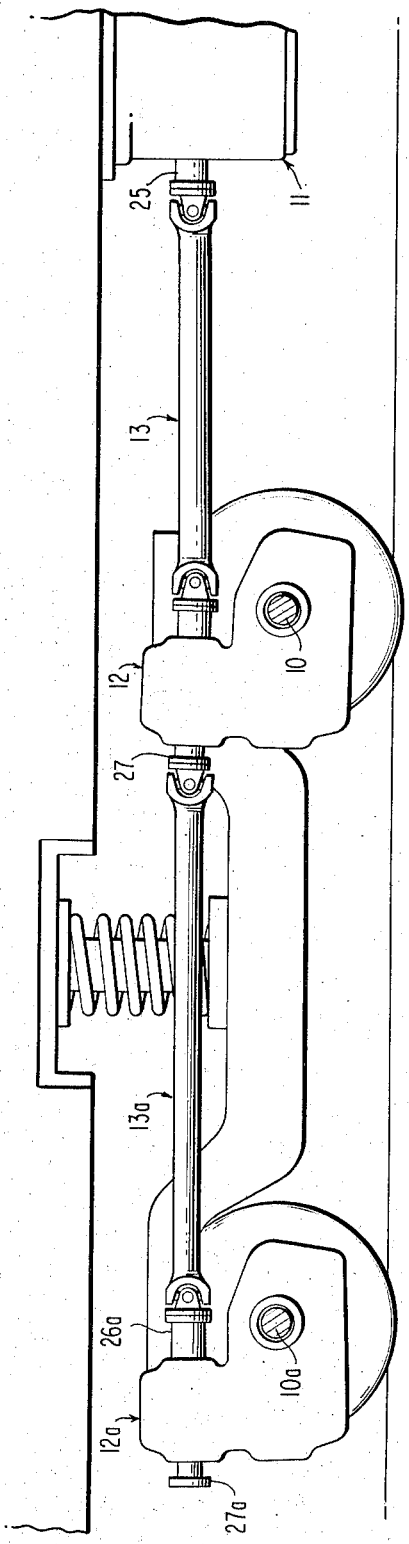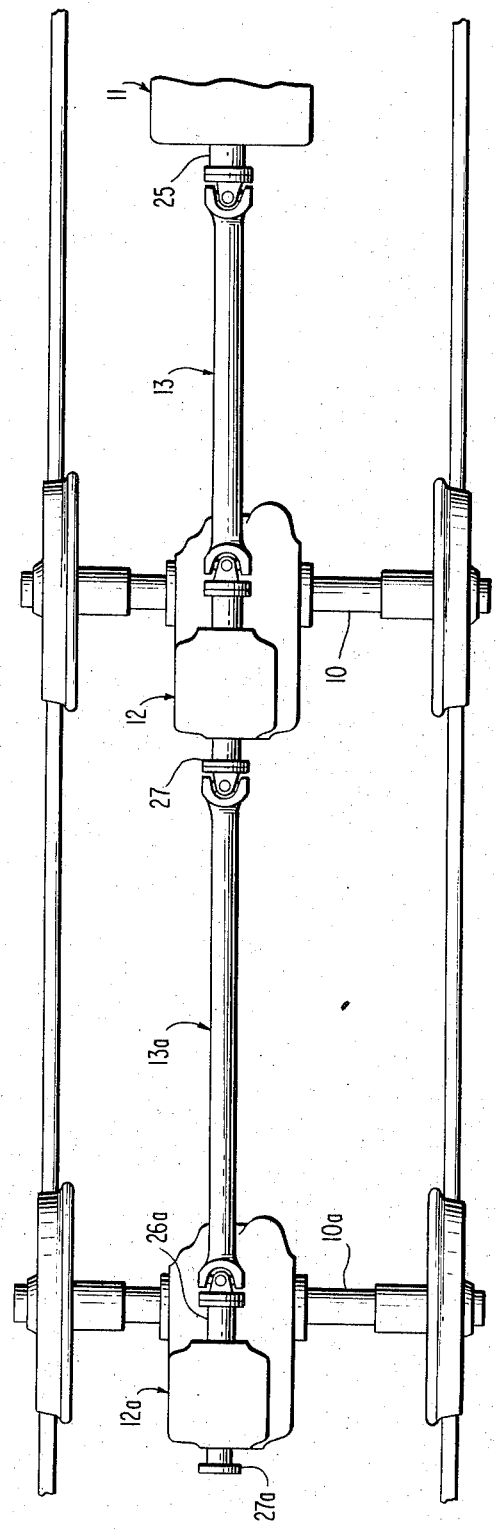

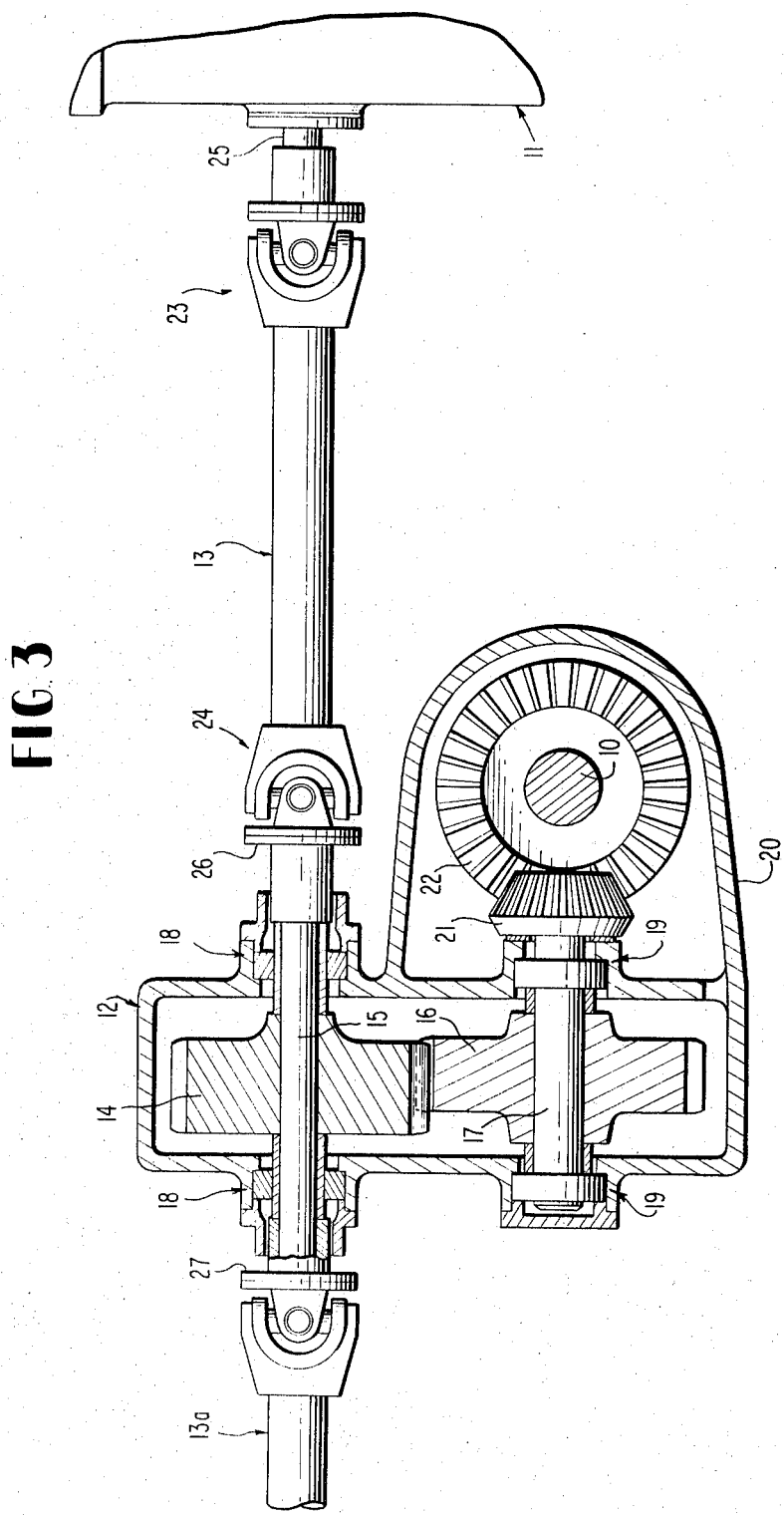

ARTICULATED RAILWAY BOGIE SHIFTABLE DRIVE ASSEMBLY

This invention relates to the mechanical transmission of rotary motion from the prime mover of a powered railcar to the driven bogie wheels which also involves compensating for the changes in the distance between the driving and driven elements due to relative movement between the bogie and the car while running along a track.

In the past, the usual method of such compensation involved the use of such means as telescoping shafts, or splined connections, between moving elements which allowed for axial displacement of one element with respect to the other during rotary motion.

However, these methods have certain drawbacks due to the fact that there is a considerable amount of friction developed because all of the side walls of the splines, or grooves, of the telescoping members are in continuous frictional contact at all times.

Not only does the excessive amount of surface area in contact produce greater wear and friction during relative axial displacement, but the increased force required to effect such displacement produces unnecessary axial thrust loads on the various elements of the system, including the bearings which otherwise could be designed to support primarily radial loads only.

Therefore, it is an object of this invention to provide a mechanical rotary motion transmission system in which the foregoing disadvantage has been substantially eliminated.

It is a further object of the invention to provide a mechanical rotary motion transmission system in which no splined connections between elements or telescoping shafts are required, the axial displacement between them being absorbed by the coacting elements of the system itself so that sliding frictional surface contact is reduced to a minimum.

Other objects and advantages will be apparent to those skilled in the art after reading the following specification in connection with the annexed drawings, in which:

FIG. 1 is a schematic view, in elevation, of a preferred form of mechanical motion transmission system constructed in accordance with the present invention;

FIG. 2 is a schematic plan view of the same, and;

FIG. 3 is a schematic cross-sectional elevation of one of the transfer mechanisms for transmitting power to a bogie axle.

In the drawings there is shown a pair of axles 10 and 10a for the two pairs of wheels of a four-wheel bogie which supports a powered railcar (not shown) containing a prime mover (not shown) of any conventional type, either electrical, internal combustion, or gas turbine, etc. having an output transmission means 11, which is connected to drive a pair of power transfer mechanisms, indicated generally by numerals 12 and 12a, by means of cardan shafts, indicated generally by numerals 13 and 13a.

While powered railcars of this type, having power means to drive the vehicle by means of driven bogies are well known in the art, one form of such railcar is disclosed and claimed in application Ser. No. 350,807, filed concurrently with this application and one form of bogie adapted for use with this invention is disclosed and claimed in application Ser. No. 350,804, filed concurrently with this application.

As shown in FIG. 3, the transfer mechanism 12 comprises a housing, which contains a spur gear 14 which is fixedly secured to a short horizontal shaft 15 to enable gear 14 to operatively mesh with a second spur gear 16, also mounted on a horizontal shaft 17. Shaft 15 is rotatably journalled in the housing by means of bearings 18, while shaft 17 is carried by bearings 19.

One end of shaft 17 carries a beveled pinion gear 21, in a position to continuously mesh with a beveled ring gear 22 secured to the axle 10.

The cardan shaft 13, it should be noted, may comprise a solid, or tubular, shaft provided with conventional universal joints 23 and 24, one of which is connected to rotatable output element 25 of the prime mover transmission 11, the other one being connected to one of the ends 26 of shaft 15 projecting from housing 20. In this connection it should also be noted that the bearings 18 may be either plain bearings, or anti-friction ball or roller bearings of the type which will permit free axial movement of the shaft, as a result of which, the cardan shaft 13 may have a unitary construction with a fixed length.

Any variation in the distance between the output element 25 and input element 26, caused by relative movement of the bogie with respect to the railcar it supports, will cause an axial shifting of shaft 15 and the gear 14 carried thereon, which will be permitted by the bearings 18. Even if these bearings are plain cylindrical journal bearings, it will be appreciated that the total area of contact between the shaft and bearing is considerably less than would be the case where the cardan shaft comprised two elements telescopically joined by splines.

Obviously, there will also be relative axial displacement between gears 14 and 16, since gear 16 is fixed on shaft 17, which must be axially fixed to allow proper engagement of gears 21 and 22. While these are shown as bevelled gears, it is obvious that they could be of the worm and pinion type.

While the teeth of the two gears 14 and 16 could be of the same width without affecting operation of the system, the ability of the gears to transmit maximum torgue would occur only at such times as the two gears were in radial alignment, and the effective operating limit would have to be based on the width of the axial surfaces of the two sets of teeth in the positions of maximum axial displacement, with the result that neither gear could be designed for maximum load capability.

However, as a compromise, it is possible to provide one of the gears 14 or 16 with a tooth width designed for the maximum load characteristics and provide the other gear with complementary teeth but having a greater width sufficient to ensure that the entire width of the surfaces of the first gear will always be engaged. In FIG. 3, gear 14 has been provided with wider gears than gear 16, but the reverse relationship could be used. The only criterion is, that the excess in width of the wider teeth be equal to the expected axial displacement between the two gears.

As seen in FIGS. 1 and 2, there are two transfer mechanisms 12 and 12a attached to respective axles 10 and 10a of a four-wheel bogie, and transfer mechanism 12a is a substantial duplicate of the mechanism 12, just described. As seen in FIG. 3, both ends of shaft 15 project outwardly of housing 20 and the end opposite to end 26 can be provided with a flange 27, which is not used if only a single axle is driven. In the case of a two axle bogie, it is common practice to resiliently mount the ends of each axle on a main bogie frame which, in turn, is resiliently attached to the railcar. Thus, not only does each axle move relative to the vehicle, but both axles are independently movable with respect to each other.

For this reason, the present invention is especially useful for driving two, or more, axles of a bogie of the type wherein the axles are individually sprung from a single driving shaft. As shown in FIGS. 1 and 2, no separate drive shaft is needed for the additional axle 10a. All that is necessary is, to connect a second cardan shaft 13a between the flange 27 of the transfer mechanism 12 and the input end 26a of transfer mechanism 12a. Cardan shaft 12a, like shaft 12, is a unitary rod, or tube, which is inextensible, without any splined connections or other means to provide a telescopic function. The only difference in the functioning of the slidable element in mechanism 12a is, that its axial displacement is affected, not only by the axial displacement of the corresponding element in mechanism 12 due to the movement of axle 10 with repsect to the vehicle, but also by relative movements of axles 10 and 10a with respect to each other.

I claim:

1. In a system for transmitting power from the prime mover fixedly attached to the frame of a railcar to the wheels of a bogie supporting said railcar, said bogie being movably secured to said railcar frame, said prime mover having a rotary output element, said bogie including a power transfer mechanism having a housing and a rotary input element, a cardan shaft having a fixed length to be connected between said input and output elements, said input element comprises a first spur gear journalled in said housing for rotation about an axis fixed with respect to the housing and for axial displacement along said axis resulting from relative movement between said bogie and railcar, and means in said housing to transmit rotational force from said input element to a bogie wheel, said means also including a second spur gear mounted in said housing for rotation about an axis parallel with and in meshing engagement with said first spur gear to maintain the amount of said transmitted force constant regardless of said axial displacement of the first gear.

2. The invention according to claim 1, wherein said input element comprises a rotary shaft journalled for said axial displacement, said first spur gear being fixedly secured to said shaft.

3. The invention according to claim 2, which includes means to maintain the gear tooth contact surface area between said meshing gears constant regardless of said displacement.

4. The invention according to claim 3, wherein the width of the gear teeth of one of said meshing gears is greater than the width of the teeth of the other of the meshing gears by an amount at least equal to the maximum value of the expected axial displacement of said input element.

5. The invention according to claim 1, wherein said bogie includes two pairs of driven wheels, each of said pairs of wheels being connected to one of a pair of horizontally spaced parallel axles carried by said bogie, a transfer mechanism for each of said axles, each including a housing and a rotary input means journalled in the respective housing for rotation and for axial displacement, a second cardan shaft having a fixed length connected between said respective input element, and means in each said housing to transmit the same rotational force from an input element to its respective axle regardless of said displacement.

6. The invention according to claim 5, wherein said bogie includes a frame and each of said axles is resiliently secured to the bogie frame for independent relative movement with respect thereto, each of said transfer mechanisms being mounted on a respective axle.

7. The invention according to claim 6, wherein the rotary input element of one of said transfer mechanisms includes a shaft mounted in the housing for rotation and for axial displacement having both ends projecting outwardly of the housing, the ends of said projecting shaft being respectively connected to one end of the first and second cardan shafts.

* * * * *